Figure 1:
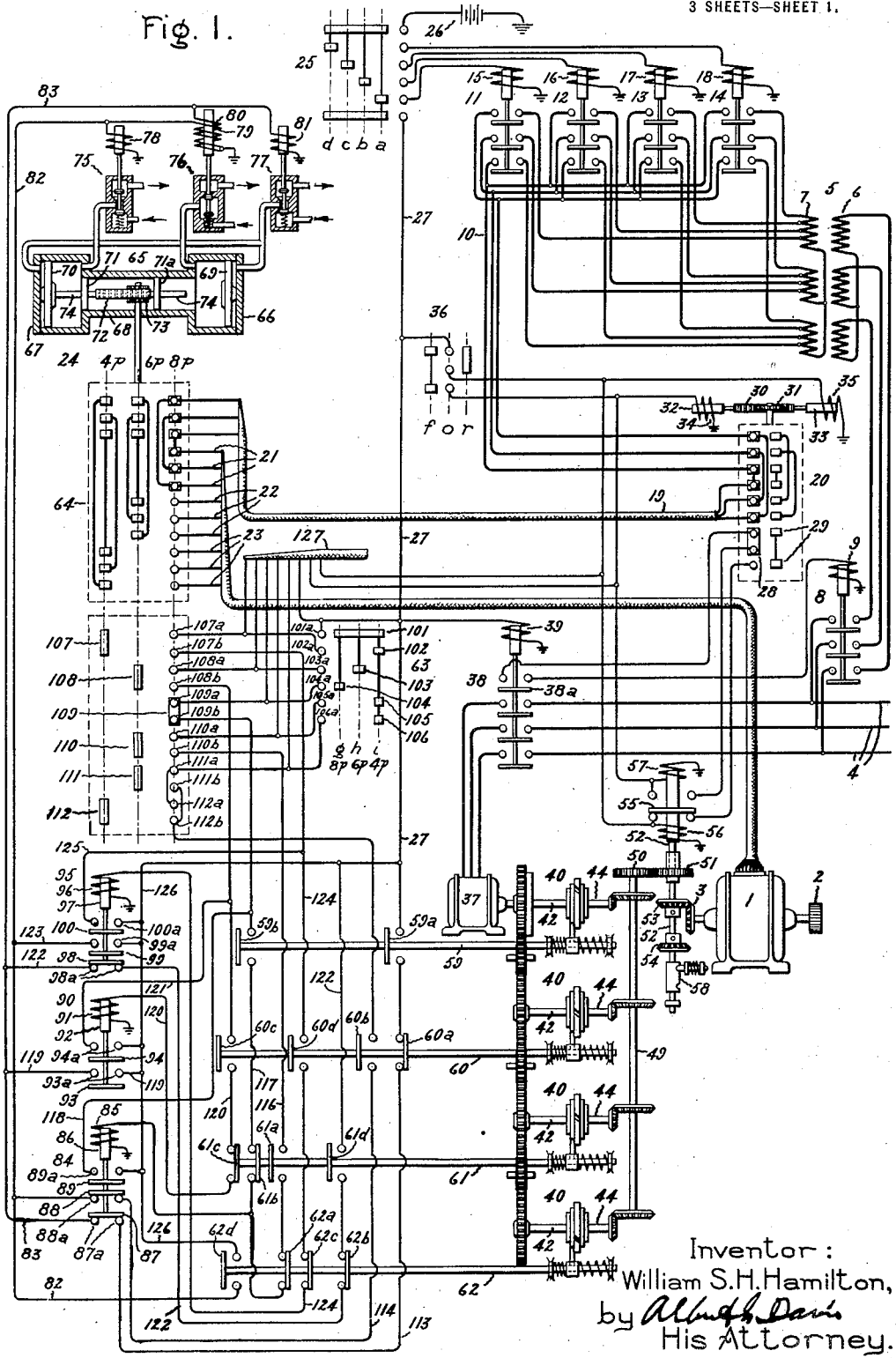

W. S. H. HAMILTON.
ELECTRICAL REGENERATIVE CONTROL APPARATUS AND SYSTEM.
APPLICATION FILED MAR. 3, 1919.

1,376,015.

Patented Apr. 26, 1921.
3 SHEETS—SHEET 1.

Inventor:
William S.H. Hamilton,
by Albert G. Davis
His Attorney.

W. S. H. HAMILTON.
ELECTRICAL REGENERATIVE CONTROL APPARATUS AND SYSTEM.
APPLICATION FILED MAR. 3, 1919.

1,376,015.

Patented Apr. 26, 1921.
3 SHEETS—SHEET 2.

Inventor:
William S. H. Hamilton,
by Albert G. Davis
His Attorney.

W. S. H. HAMILTON.
ELECTRICAL REGENERATIVE CONTROL APPARATUS AND SYSTEM.
APPLICATION FILED MAR. 3, 1919.
1,376,015.
Patented Apr. 26, 1921.
3 SHEETS—SHEET 3.
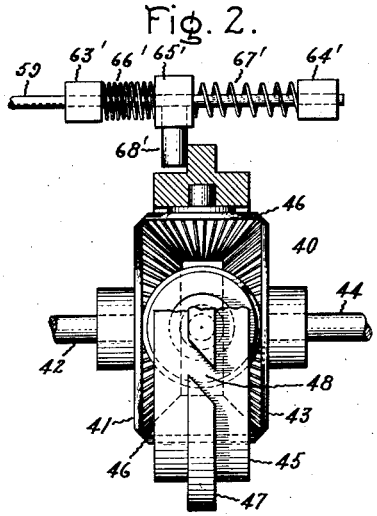
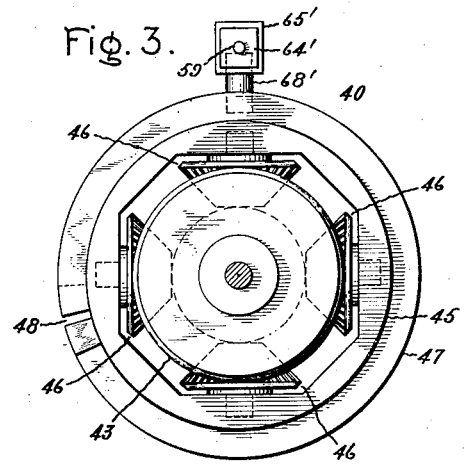
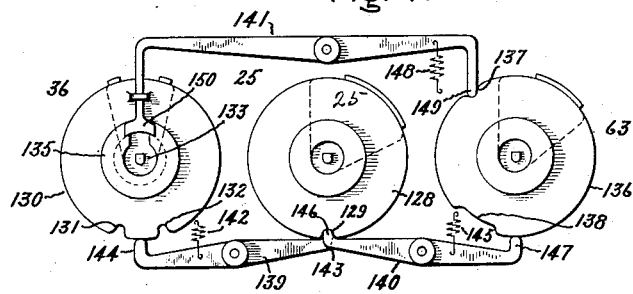
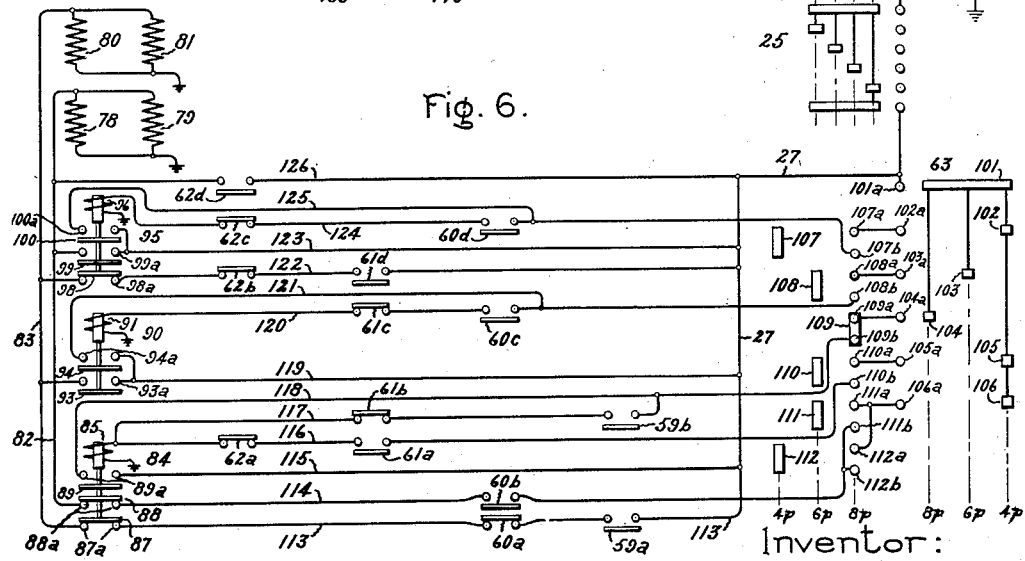
Inventor:
William S. H. Hamilton,
by Albert G. Davis
His Attorney.

UNITED STATES PATENT OFFICE.

WILLIAM S. H. HAMILTON, OF SCHENECTADY, NEW YORK, ASSIGNOR TO GENERAL ELECTRIC COMPANY, A CORPORATION OF NEW YORK.

ELECTRICAL REGENERATIVE CONTROL APPARATUS AND SYSTEM.

1,376,015. Specification of Letters Patent. Patented Apr. 26, 1921.

Application filed March 3, 1919. Serial No. 280,308.

*To all whom it may concern:*

Be it known that I, WILLIAM S. H. HAMILTON, a citizen of the United States, residing at Schenectady, in the county of Schenectady, State of New York, have invented certain new and useful Improvements in Electrical Regenerative Control Apparatus and Systems, of which the following is a specification.

My invention relates to electrical systems of power transmission and regenerative braking and particularly to systems of this kind comprising one or more variable pole induction type dynamo electric machines, which are connected to a mechanical load and are adapted to operate as induction motors to drive or as induction generators to brake said load.

In the control of variable pole dynamo electric machines, it is necessary, in order to avoid great and sudden changes in the character and value of the torque thereof, when the number of poles is changed, that the transition from one pole number to another pole number occur at a speed at which the character and value of the torque is approximately the same for both pole numbers. In traction systems comprising locomotives equipped with variable pole induction motors it is particularly important that the transition from one pole number to another pole number be effected without substantial change in torque since, assuming the induction machines to be operating as motors with a given number of poles and developing a certain driving torque, a premature increase in the number of poles may cause the induction machines to operate as generators and develop a braking torque of sufficient magnitude to buckle the train hauled by the locomotive. On the other hand, assuming the induction machines to be operating as generators with a given number of poles and developing a certain braking torque, a premature decrease in the number of poles may cause the induction machines to operate as motors and develop a motoring torque of sufficient magnitude to break the train apart.

It is manifestly unsafe to depend upon the operator to change the pole numbers at the proper time, and it is desirable, therefore, that means be provided to insure changing from one pole number to another pole number at the proper speeds. It is desirable, however, that the operator have under his control the speed to which the induction machines will accelerate by reason of the development therein of motoring or driving torque and the speed to which they will decelerate by reason of the development therein of generating or braking torque.

One object of my invention, therefore, is to provide a new and improved system of power transmission and regenerative braking, comprising one or more variable pole induction type dynamo electric machines, wherein the transition from one pole number to another pole number is effected in response to the speed of said machines. Another object of my invention is to provide in such a system means whereby the operator may control the speed of said machines. Other objects of my invention will hereinafter appear.

The manner in which the several objects of my invention are accomplished may best be understood by reference to the accompanying drawings when considered in connection with the following specification while the scope of my invention is defined in the appended claims.

Figure 7:
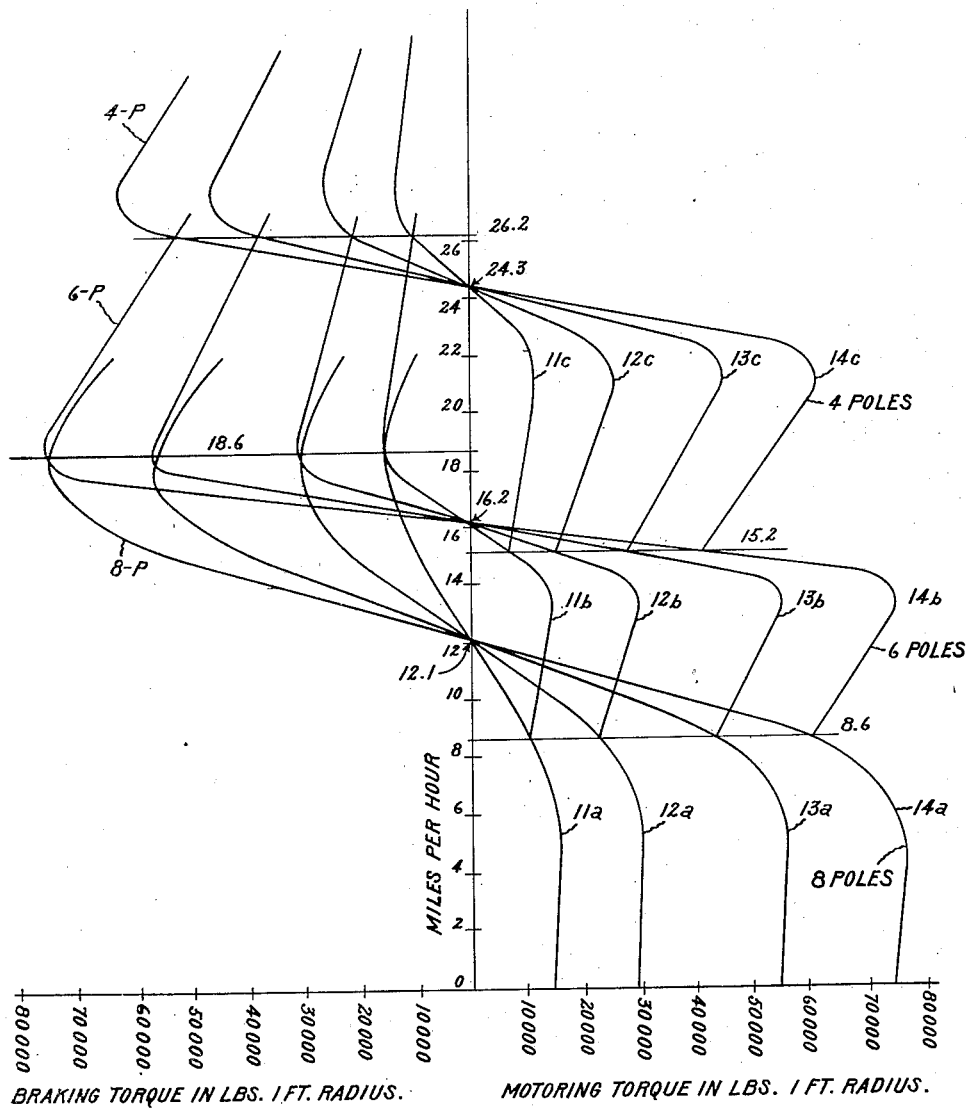

In the drawings, Figure 1 is a diagrammatic showing of a system embodying my invention; Figs. 2 and 3 are front and side elevations of differential control mechanism employed in the system of Fig. 1; Fig. 4 is a plan view of interlocking mechanism, between the main controller, pole selector and reverser controller, which may be employed in the system of Fig. 1; Fig. 5 is a perspective view of the operating handle for the reverser controller; Fig. 6 is a simplified diagram of certain of the control circuits shown in Fig. 1; and Fig. 7 is a diagram comprising curves showing the relation of the torque and speed of the induction motor, or motors, used in the system of Fig. 1 for a given frequency of supply and impressed voltages and with different numbers of poles.

Referring to Fig. 1, 1 denotes a variable pole induction machine, or motor, the rotor of which is provided with a gear 2, by means of which it may be coupled to any desired load, and a bevel gear 3, for a purpose hereinafter described. 4 denotes a three-phase supply circuit, 5 denotes a transformer having primary and secondary windings 6 and 7, and 8 denotes an electromagnetic switch, having an operating winding 9, for connecting the three-phase supply circuit 4 to the primary windings 6 of the transformer 5. 10 denotes three-phase conductors which may be connected to different points of the secondary windings 7 of the transformer 5 by means of electromagnetic switches 11, 12, 13 and 14, which are provided with operating windings 15, 16, 17 and 18 respectively. The conductors 10 are connected to three-phase conductors 19 by means of a motor operated reversing switch 20 hereinafter more fully described. The conductors 19 are connected to one, or another, of three sets of conductors 21, 22 and 23 by means of a motor operated pole changing switch 24, hereinafter more fully described. The conductors 21 are connected to an eight pole winding, the conductors 22 to a six pole winding, and the conductors 23 to a four pole winding of the induction motor 1. From the above it will be evident that, with the switches 8 and 11 closed and the pole changing switch 24 in the position illustrated in Fig. 1, the eight pole winding of the induction motor 1 will be energized from the three-phase supply circuit 4 by means of the switch 8, transformer 5, switch 11, conductors 10, reversing switch 20, conductors 19, pole changing switch 24 and conductors 21.

The operating windings 15, 16, 17 and 18 of the electromagnetic switches 11, 12, 13 and 14 may be energized selectively by means of the four position main controller 25, which, in position $a$, connects a battery, or other source of current, 26 to the operating winding 15 of the switch 11, and, in the successive positions $b$, $c$, and $d$, connects the battery to the operating windings 16, 17 and 18, respectively, of the switches 12, 13 and 14. In all of its operating positions the controller 25 connects the battery 26 to a control conductor 27.

The motor operated reversing switch 20 comprises a drum upon which are carried main circuit contacts and interlocking contacts 28 and 29. The drum is operated, as illustrated, by means of the rack 30 and pinion 31, to the former of which are connected opposed cores 32 and 33 arranged to be actuated by windings 34 and 35. The windings 34 and 35 may be selectively energized by means of a reverser controller 36 which, when in the $f$, or forward position, connects the winding 34 to the control conductor 27, when in the $r$, or reverse position, connects the winding 35 to the control conductor 27, and when in the $o$, or off position, is ineffective to connect either the winding 34 or 35 to the control conductor 27.

37 denotes an induction motor to which the supply circuit 4 may be connected by means of an electromagnetic switch 38, having an operating winding 39 connected to the control circuit 27. Upon the operation of the main controller 25 to an operative position and the consequent energization of the control circuit 27, the switch 38 will be closed.

40 denotes differential mechanism, the construction of which may best be explained with reference to Figs. 2 and 3 in which the details thereof are shown. Each of these devices comprises a bevel gear 41 mounted upon a shaft 42, a bevel gear 43 mounted upon a shaft 44, and a yoke 45 upon which are carried bevel gears 46 which mesh with the bevel gears 41 and 43. The yoke 45 is provided with a ridge 47 through which there extends diagonally a groove 48. It will be clear that, if the shaft 42 rotates in a counter clockwise direction faster than shaft 44 and the shaft 44 is rotating in a counter clockwise direction, the yoke 45 will rotate in a counter clockwise direction, the shaft 42 and yoke being viewed from the right in Fig. 2; whereas, if the shaft 42 rotates in a counter-clockwise direction and the shaft 44 is rotating in a clockwise direction, the yoke 45 will rotate in either a counter-clockwise or a clockwise direction accordingly as the speed of the shaft 44 is less or greater than the speed of the shaft 42. Now referring to Fig. 1, the shafts 42 are connected directly or through gearing so as to be driven by the motor 37, preferably at equal speeds. The shafts 44 are connected, by means of bevel gearing having unequal ratios, to a shaft 49, which is coupled, by means of a gear 50, to a gear 51 splined to a shaft 52. Bevel gears 53 and 54 are keyed to the shaft 52, which, together with a switch 55, are operable, by means of windings 56 and 57, to move the bevel gear 53 or the bevel gear 54 into mesh with the gear 3 driven by the motor 1. 58 denotes a device for yieldingly locking the shaft 52 in its extreme positions. The operating windings 56 and 57 are respectively connected in parallel with the windings 35 and 34 of the motor operated reverser 20 so that, upon a reversal of the electrical connections to the motor 1, the driving connection between the shaft 52 and motor 1 will be reversed, thereby maintaining the same direction of rotation of the shaft 52 notwithstanding the direction of rotation of the motor 1 is reversed. When the shaft 52 is in its lower position, switch 55 connects the lowermost or first contact on the motor operated reversing switch 20 to a conductor leading to the ungrounded terminal of winding 56. When the shaft 52 is in its upper position, switch 55 connects the second contact from the bottom on the motor operated reversing switch 20 to a conductor leading to the ungrounded terminal of winding 57. From the third contact from the bottom on the motor operated reversing switch 20 extends a circuit to the ungrounded terminal of the operating winding 9 of the electromagnetic switch 8, in which circuit is located an interlocking switch 38ª actuated by switch 38.

59, 60, 61 and 62 denote switch operating rods similarly actuated by the differential mechanisms 40. Referring to Fig. 2, the rod 59 is guided by supports 63' and 64' and is provided intermediate said supports with an abutment 65' to which it is rigidly fixed. Between the abutment 65' and supports 63' and 64' are arranged springs 66' and 67' tending to center the abutment 65' between them in the plane of the ridge 47 on the yoke 45. A pin 68' extends from the abutment 65' and is adapted to move the rod 59 to the left or right depending upon the direction of rotation of the yoke 45. If the yoke 45 is rotating in a counter clockwise direction one side of the groove 48 will cam the pin 68' to the position shown, that is, to the left of the ridge 47, whereas, if the yoke 45 is rotating in a clockwise direction, the other side of the groove 48 will cam the pin 68' to the right side of the ridge. Referring to Fig. 1, the bevel gearings, between the shafts 44 and the shaft 49, are so designed that, when the speed of the main motor 1 bears a certain relation to the speed of the pilot motor 37, the rod 59 will be moved by its differential mechanism 40 from its left hand position, as illustrated in Fig. 1, to its right hand position. At higher speeds of the main motor 1 relative to the speed of the pilot motor 37 the rods 60, 61 and 62 will be successively moved from their left hand positions, as illustrated, to the right hand positions. The rod 59 actuates interlocking switches 59ª and 59ᵇ, the rod 60 actuates interlocking switches 60ª, 60ᵇ, 60ᶜ and 60ᵈ, the rod 61 actuates interlocking switches 61ª, 61ᵇ, 61ᶜ and 61ᵈ, and the rod 62 actuates interlocking switches 62ª, 62ᵇ, 62ᶜ and 62ᵈ.

63 denotes a manually operable pole selector having three operating positions $g$, $h$ and $i$ which may be hereinafter referred to as the eight, six and four pole positions thereof. The construction and electrical connections of the selector will be hereinafter described.

The motor operated pole changing switch 24 comprises a drum 64, which is provided with contacts for connecting the conductors 19 to the conductors 21, conductors 22, or the conductors 23 so as to energize the eight pole, six pole or four pole windings of the motor 1, and with interlocking switches, the connection and operation of which will be hereinafter explained. The drum 64 is actuated to three definite positions by means of a fluid pressure motor 65 comprising end cylinders 66 and 67 and an intermediate cylinder 68 of less diameter than the end cylinders. In cylinders 66 and 67 are located free pistons 69 and 70, and in the cylinder 68, are located opposed pistons 71 and 71ª, between which extends a rack 72 engaging a pinion 73 secured to the drum 64, and beyond which extend rods 74 which are operable to move the pistons 71 and 71ª to their mid-positions when the pistons 69 and 70 move to their innermost positions. The movements of the pistons are controlled by means of the electromagnetically operated fluid pressure valves 75, 76 and 77. The valve 75 is provided with an operating winding 78, the valve 76 is provided with two operating windings 79 and 80, and the valve 77 is provided with an operating winding 81. When the winding 78 of valve 75 is deënergized, fluid pressure is exhausted from the space between the pistons 70 and 71, whereas, when it is energized, fluid pressure is admitted to said space. When the windings 79 and 80 of the valve 76 are deënergized, fluid pressure is admitted to the space between pistons 69 and 71ª, whereas, when either the winding 79 or 80 is energized, fluid pressure is exhausted from said space. When the winding 81 of the valve 77 is deënergized, fluid pressure is exhausted from the space to the right of piston 69 and to the left of piston 70 whereas when it is energized fluid pressure is admitted to said spaces. The windings 78 and 79 are connected to and energized from a conductor 82 and windings 80 and 81 are connected to and energized from a conductor 83. It will now be clear that, if neither the conductor 82 nor 83 is energized, fluid pressure will be exhausted by the valve 75 from the space between the pistons 70 and 71, fluid pressure will be admitted by the valve 76 to the space between the pistons 69 and 71ª, and fluid pressure will be exhausted by the valve 77 from the space to the right of piston 69 and to the left of piston 70. The pistons and the drum 64 will then be moved to the positions in which they are illustrated so that the conductors 19 will be connected to the eight pole winding of the motor 1. If conductor 82 is deënergized and conductor 83 energized, fluid pressure will be exhausted by the valve 75 from the space between the pistons 70 and 71, fluid pressure will be exhausted by the valve 76 from the space between the pistons 69 and 71ª, and fluid pressure will be admitted by the valve 77 to the space on the right of piston 69 and on the left of piston 70. The pistons 69 and 70 will then be moved to their innermost positions and, through their engagement with the rods 74, the pistons 71 and 71ª and the rack 72 therebetween will be moved to mid-position, thereby rotating the drum to a position in which the conductors 19 will be connected to the six pole winding of the induction motor 1. Finally, if the conductor 82 is energized and the conductor 83 is deënergized, fluid pressure will be admitted by the valve 75 to the space between the pistons 70 and 71, fluid pressure will be exhausted by the valve 76 from the space between the pistons 69 and 71ª, and fluid pressure will be exhausted by the valve 77 from the space on the right of piston 69 and on the left of piston 70. The pistons 71 and 71ª will then be moved to their extreme right hand positions thereby rotating the drum 64 to a position in which it will connect the conductors 19 to the four pole winding of the motor 1.

84 denotes an electromagnetic control switch having an operating winding 85, a core 86, switch blades 87, 88 and 89, and contacts 87ª, 88ª and 89ª coöperating with the blades 87, 88 and 89. 90 denotes an electromagnetic control switch having an operating winding 91, a core 92, switch blades 93 and 94, and contacts 93ª and 94ª coöperating with the blades 93 and 94. 95 denotes an electromagnetic control switch having an operating winding 96, a core 97, switch blades 98, 99 and 100, and contacts 98ª, 99ª and 100ª coöperating with the blades 98, 99 and 100.

The manually operable pole selector 63 is provided with electrically interconnected contact segments 101, 102, 103, 104, 105 and 106 adapted to engage, under certain conditions, with contacts 101ª, 102ª, 103ª, 104ª, 105ª and 106ª. The drum 64 of the motor operated pole changer 24 is provided with contact segments 107, 108, 109, 110, 111 and 112 adapted to bridge, under certain conditions, contacts 107ª and 107ᵇ, contacts 108ª and 108ᵇ, contacts 109ª and 109ᵇ, contacts 110ª and 110ᵇ, contacts 111ª and 111ᵇ, and contacts 112ª and 112ᵇ, respectively. Contact 101ª is connected to the control conductor 27. Contact 102ª is connected to contact 107ª, contact 103ª to contact 108ª, contact 104ª to contact 109ª, contact 105ª to contact 110ª, and contact 106ª to contact 111ª. Contact 111ª is connected to contact 112ª, and contact 111ᵇ to contact 112ᵇ.

Referring to Figs. 1 and 6, between the conductor 83 and the control conductor 27 extends a circuit 113 in which are located contacts 87ª and switch blade 87 of the switch 84, interlocking switch 60ª and interlocking switch 59ª. Between the conductor 82 and the contact 112ᵇ extends a circuit 114 in which are located contacts 88ª and switch blade 88 of the switch 84 and interlocking switch 60ᵇ. Between the right hand contact 89ª of the switch 84 and the control conductor 27 extends a circuit 115. Between the ungrounded terminal of the operating winding 85 of the switch 84 and the contact 110ᵇ extends a circuit 116 in which are located interlocking switch 62ª and interlocking switch 61ª. Between the ungrounded terminal of the operating winding 85 and the contact 109ᵇ extends a circuit 117 in which are located interlocking switch 61ᵇ and interlocking switch 59ᵇ. Between the left hand contact 89ª of the switch 84 and the contact 109ᵇ extends a circuit 118.

Between the conductor 83 and the control conductor 27 extends a circuit 119 in which are located the contacts 93ª and switch blade 93 of the switch 90. Between the ungrounded terminal of the operating winding 91 of the switch 90 and contact 108ᵇ extends a circuit 120 in which are located interlocking switch 61ᶜ and interlocking switch 60ᶜ. The right hand contact 94ª of the switch 90 is connected to the right hand contact 93ª of the switch 90, and the left hand contact 94ª is connected by means of a circuit 121 to the contact 108ᵇ. Between the conductor 83 and the control conductor 27 extends a circuit 122 in which are located the contacts 98ª and the switch blade 98 of the switch 95, interlocking switch 62ᵇ and interlocking switch 61ᵈ. Between the conductor 82 and the control conductor 27 extends a circuit 123 in which are located the contacts 99ª and switch blade 99 of the switch 95. Between the ungrounded terminal of the operating winding 96 of the switch 95 and the contact 107ᵇ extends a circuit 124 in which are located interlocking switch 62ᶜ and interlocking switch 60ᵈ. The right hand contact 100ª of the switch 95 is connected to the right hand contact 99ª of the switch 95. The left hand contact 100ª is connected by means of a circuit 125 with the contact 107ᵇ. Between conductor 82 and the control conductor 27 extends a circuit 126 in which is located the interlocking switch 62ᵈ. As previously pointed out, conductor 82 is connected to the operating windings 78 and 79 of the electromagnetically operated valves 75 and 76, while the conductor 83 is connected to the operating windings 80 and 81 of the electromagnetically operated valves 76 and 77.

In order to adapt the system for multiple train control, a cable 127 (see Fig. 1) comprising conductors connected to contacts 107ª, 108ª, 109ª, 110ª and 111ª, control conductor 27 and the conductors leading to the operating windings 56 and 57, respectively, is led to corresponding contacts and conductors of other units of the system in which the apparatus of Fig. 1 is included.

For reasons, which will hereinafter more fully appear, it is necessary that the main controller 25 be interlocked with the reverser controller 36 so that the latter can be operated only when the main controller is in its off position and so that the main controller can be operated only when the reverser controller is either in forward or reverse positions. It is also important that the reverser be so constructed that it must be in the off position in order that the operating handle thereof can be removed. It is desirable also that the pole selector 63 be interlocked with the main controller 25 so that the pole selector must be in one of its operating positions before the main controller 25 can be moved from its off position, and, finally, it is important that the pole selector 63 be interlocked with the reverser controller 36 so that the pole selector must be in its off position in order that the operating handle of the reverser controller 36 can be removed. One system of interlocking the various elements above referred to, in order to insure the correct operation thereof, is illustrated in Fig. 4. The main controller 25 is provided with a disk 128 in the periphery of which is located a notch 129. The reverser controller 36 is provided with a disk 130 having peripheral notches 131 and 132. The disk 130 is fastened to a spindle 133, the end of which is shaped to fit in a socket of an operating handle 134, shown in Fig. 5. A stationary guard 135 is located over the end of the spindle 133 and is provided with an opening so shaped that the handle 134 may be applied or removed from the spindle 133 only when the reverser is in the off position, in which position it is illustrated in Fig. 4. The pole selector 63 is provided with a disk 136 having a peripheral notch 137 and a peripheral elongated depression 138. 139, 140 and 141 denote interlocking levers. The lever 139, which is urged in a clockwise direction by means of a spring 142, is provided with a lug 143, adapted to coöperate with the notch 129 of the disk 128, and with a lug 144 adapted to coöperate with the notches 131 and 132 of the disk 130. The lever 140, which is urged in a counter-clockwise direction by means of a spring 145, is provided with a lug 146, adapted to coöperate with the notch 129 of the disk 128, and with a lug 147, adapted to coöperate with the depression 138 of the disk 136. The lever 141, which is urged in a clockwise direction by a spring 148, is provided with a lug 149, adapted to coöperate with the notch 137 in the disk 136, and with a fish tail barrier 150 coöperating with the guard 135 so as to prevent the insertion or removal of the handle 134 from the spindle 133 except when the lug 149 is seated in the notch 137 of the disk 136, in which position it is shown in Fig. 4.

From the above description of the construction of the interlocking mechanism, it will be evident that in order to move the main controller 25 from the off position, in which position it is illustrated in Fig. 4, it is necessary for the reverser controller 36 to be in the forward or reverse position so that the lug 144 will seat in the notch 131 or 132, and for the pole selector 63 to be in an on position, so that the lug 147 will seat in the depression 138. It will also be clear that with the projection 144 seated in the notch 131, or in the notch 132, and with the main controller 25 moved to an on position, it will be impossible to operate the reverser controller 36. It will also be evident that unless the reverser controller 36 is in the off position and the pole selector 63 is likewise in the off position, the operating handle 134 of the reverser controller 36 cannot be removed from the spindle 133.

Preparatory to a description of the operation of my invention, a brief explanation of the torque speed characteristics of the main induction machine, or motor, 1 employed in the system of Fig. 1, for a given frequency of supply and with different impressed voltages and pole numbers, which are depicted in Fig. 7 will now be made. In said figure ordinates represent the speed of the induction motors, in terms of miles per hour of locomotive driven thereby, abscissas, measured to the right from the vertical line, represent motoring torque, in pounds at one foot radius, developed by the motors, and the abscissas, measured to the left from the vertical line, represent braking torque, in pounds at one foot radius, developed by the motors when acting above synchronism as generators.

The curves $11^a$, $12^a$, $13^a$ and $14^a$ are the torque speed characteristics for the eight pole connection with impressed voltages secured, respectively, by the closures of switches 11, 12, 13 and 14, shown in Fig. 1. Similarly, the curves $11^b$, $12^b$, $13^b$ and $14^b$ are the torque speed characteristics for the six pole connection with impressed voltages secured, respectively by the closure of switches 11, 12, 13 and 14. Likewise the curves $11^c$, $12^c$, $13^c$ and $14^c$ are the torque speed characteristics for the four pole connection with impressed voltages secured, respectively, upon the closure of switches 11, 12, 13 and 14. Upon an inspection of these characteristics, it will be seen that with the eight pole connection the transition from motoring to braking or vice versa, occurs at 12.1 miles per hour, that with the six pole connection the transition occurs at 16.2 miles, and that with the four pole connection the transition occurs at 24.3 miles per hour. It will also be seen that, during motoring, corresponding curves for the eight pole and six pole connections intersect along a substantially straight line corresponding to 8.6 miles per hour and that corresponding curves for the six pole and four pole connections intersect along a substantially straight line corresponding to 15.2 miles per hour. Also it will be seen that, during generating, corresponding curves for the four pole and six pole connections intersect along a line corresponding to 26.2 miles per hour and that corresponding curves for the six pole and eight pole connections approximately coincide along a line corresponding to 18.6 miles per hour. Obviously, however, if when motoring the transfer from eight to six poles, or vice versa is effected at 8.6 miles per hour and the transfer from six to four poles, or vice versa, is effected at 15.2 miles per hour, such transfer will be unaccompanied by any substantial and sudden change in torque. Likewise, if, when generating, the transfer from four to six poles, or vice versa, is effected at 26.2 miles per hour and the transfer from six to eight poles, or vice versa, is effected at 18.6 miles per hour, no substantial shock, due to sudden and violent changes in torque, will occur.

If we assume for the purpose of illustration that my invention is embodied in a system having a machine or machines with torque speed characteristics shown in Fig. 7, my invention comprises means for insuring the transfer, when the induction machine, or machines, are operating as motors, from the eight pole to the six pole connection or vice versa at 8.6 miles per hour and from the six pole to the four pole connection or vice versa at 15.2 miles per hour and also for insuring the transfer when the induction machines are generating from the four pole to the six pole connection or vice versa at 26.2 miles per hour and from the six pole to the eight pole connection or vice versa at 18.6 miles per hour. It will be apparent that if the operator were able to effect the transfer from one pole number to another pole number, as for instance, from four poles to six poles regardless of the speed of the motors and such transfer occurred, for instance, when the machines were motoring at 22 miles per hour, the torque of the machines will be changed, providing they be operating with full voltage impressed thereon, from approximately 60,000 lbs. motoring to approximately 70,000 lbs. braking. This sudden change in the character and value of the torque would tend to buckle the train attached to the locomotive on which the motors are mounted. Also if the induction machines were generating at 14 miles per hour with the eight pole connection and with maximum voltage impressed thereon, and, therefore, developing a braking torque of approximately 35,000 lbs. and the operator transferred from eight poles to six poles, a motoring torque of approximately 73,000 lbs. would be developed. This sudden change from a braking torque of 35,000 lbs. to a motoring torque of 73,000 lbs. would tend to break apart the train attached to the locomotive.

As thus constructed and arranged, the operation of my invention is as follows:

First assume the main controller 25, the pole selector 63, and the reverse controller 36 to be in the off positions corresponding to the positions in which they are shown in Figs. 1 and 6. The operator, who is provided with but one reverser controller handle or key 134, may then apply it to the spindle 133 of the reverser controller 36 and move the reverser controller to either the forward or reverse position. Let it be assumed that he moves it to the forward position. The operating winding 34 of the reversing switch 20 will then be connected to the control conductor 27. The operator may also move the pole selector 63 to the eight, six or four pole position. Let it be assumed that he moves it to the eight pole position. Since the reverser controller 36 is in the forward position the projection 144 of the lever 139 will be caused to seat in the peripheral notch 131 of the disk 130 due to the action of the spring 142 upon the lever 139 and the projection 143 will therefore have been moved out of the notch 129 of the disk 128. Since the pole selector 63 is in an on position the projection 147 of the lever 140 will be caused to seat in the depression 138 of the disk 136 due to the action of the spring 145 upon the lever 140 and the projection 146 will, therefore, have been moved out of the notch 129 of the disk 128. The main controller may now be rotated and, assuming it to be moved to position $a$, the battery 26 will be connected to the operating winding 15 of the relay 11 whereupon the conductors 10 will be connected to the lowest voltage taps of the secondary winding 7 of the transformer 5. The control conductor 27 will also be connected to the battery 26 and thereby energized. The operating winding 34 of the reversing switch 20 will now be energized from the control conductor 27 and the reversing switch 20 be moved to the position in which it is illustrated in Fig. 1. The conductors 10 will then be connected through the forward contacts of the reversing switch 20, the conductors 19 and thence through contacts of the pole changing switch 24 to the eight pole winding of the motor 1. Upon the energization of the control conductor 27, the switch 38 will be operated by reason of the energization of the operating winding 39 thereof and the pilot motor 37 will be connected to the three phase source of alternating current 4 and the motor 37 will, therefore, begin to rotate. Upon the energization of the conductor extending between the reverser controller 36 and the operating winding 34 of the reversing switch 20, the operating winding 57 will be energized to raise the shaft 52 and to cause the gear 54 carried thereby to mesh with the gear 3. The switch 55 will then be effective to carry current to the second contact on the reversing switch 20, whence it passes through the segment 28, the third contact on the reversing switch 20 and the interlocking switch 38$^a$, which will now be closed since the switch 38 has been closed, to the operating winding 9 of the switch 8. The switch 8 will then be closed and the three phase supply circuit 4 be connected to the primary winding 6 of the transformer 5. The motor 1 will then start and operate with the lowest voltage impressed thereon. By moving the main controller 25 to positions $b$, $c$ and $d$, the switches 12, 13 and 14 will be successively operated and the motor 1 be successively connected to higher voltage taps on the transformer 5. For purposes of explanation let it be assumed that the switch 13 is closed and hence that the motor has next to the highest voltage impressed thereon. With eight poles, the torque speed characteristic of the motor will be represented by the curve $13^a$ in Fig. 7. The relation of driving torque to the load may be such that the motors will speed up to or beyond 8.6 miles per hour. At 8.6 miles per hour the switch operating rod 59 (see Fig. 1) will be operated to its right hand position by means of differential mechanism 40 and the interlocking switches $59^a$ and $59^b$ will be closed. Upon the closure of switch $59^b$ the operating winding 85 of the control switch 84 will be connected to the control conductor 27, through the circuit 117 comprising interlocking switches $61^b$ and $59^b$, both of which are closed, contact $109^b$, segment 109, contact $109^a$, contact $104^a$, segment 104, segment 101, contact $101^a$ to the control conductor 27. Winding 85 is energized and the switch blades 87 and 88 are disengaged from their contacts $87^a$ and $88^a$ and the switch blade 89 engages with its contact $89^a$. A holding circuit through the winding 85 is then made, extending from the control conductor 27, through the circuit 115, contacts $89^a$ and the switch blade 89 of the switch 84, circuit 118, to the contact $59^b$. Since the switch blade 87 and contacts $87^a$ are disengaged upon the operation of switch 84, the conductor 83 remains disconnected from the control conductor 27 notwithstanding the fact that the interlocking switches $59^a$ and $60^a$ in the circuit 113 are closed. The eight pole winding of the motor 1 will, therefore, remain connected to the source of supply notwithstanding the fact that the speed thereof increases above 8.6 miles per hour.

If the train is on a level track or on an up grade, the motors will continue to accelerate until a speed under 12.1 miles per hour is reached where the driving torque is just sufficient to pull the train along at such a speed.

If now, while the pole selector 63 is still in the eight pole position, and the controller 25 is in position $c$, the train starts down a grade, the weight of the train will cause the speed of the motor to increase above 12.1 miles per hour and the induction machine 1 will be caused to operate as a generator and the torque speed characteristic for the generator operation with the eight pole connection is represented by that portion of the curve $13^a$ lying to the left of the vertical line in Fig. 7.

It will be observed from this curve that as the speed of the motor increases the braking torque also increases under the usual operating conditions, the weight of the train and the grade will be such that at some particular speed between 12.1 miles per hour and 18.6 miles per hour a sufficient braking torque will be developed to maintain the motor at a constant speed. It will also be observed that under the usual operating conditions the engineer, by moving the controller 25 to its different positions can vary the braking torque of the motor so as to control the speed of the train down the grade.

Let it be assumed, however, that the weight of the train is such that the motor is not able to hold back the train and, therefore, the speed thereof continues to increase.

When the speed of the induction motor has increased to 15.2 miles per hour, the switch operating rod 60 is actuated by differential mechanism 40 to the right hand position thereby opening interlocking switch $60^a$ and closing interlocking switches $60^b$, $60^c$ and $60^d$. Opening of the interlocking switch $60^a$ breaks the circuit 113 extending between the right hand contact $87^a$ of the switch 84 and the control conductor 27. Closing of interlocking switch $60^b$ which is located in circuit 114 connects the right hand contact $88^a$ of the switch 84 to the contact $112^b$ which, however, is unenergized at this time. Closing of interlocking switch $60^c$, which is located in the circuit 120, effects the connection of the operating winding 91 of the switch 90 to the contact $108^b$, which, however, is unenergized at this time. The closing of the interlocking switch $60^d$, which is located in the circuit 124, effects the connection of the operating winding 96 of the switch 95 to the contact $107^b$ since the interlocking switch $62^c$, which is located in the circuit 124 is closed at this time. Since contacts $108^b$ and $107^b$ are unenergized, it will thus be seen that the operation of the switch rod 60 has no effect upon the conductors 82 and 83.

In the event of the speed of the induction machines increasing to about 18.6 miles per hour, the switch operating rod 61 will be moved by differential mechanism 40 to the right-hand position thereby closing interlocking switches $61^a$ and $61^d$, and opening interlocking switches $61^b$ and $61^c$. The closing of the interlocking switch $61^a$, which is located in the circuit 116, effects the connection of the operating winding 85 of the switch 84 to the contact $110^b$, which is unenergized, since the interlocking switch $62^a$, which is also located in the control circuit 116, is closed at this time. Opening of the interlocking switch 61ᵇ, which is located in the circuit 117, effects the deënergization of the operating winding 85 of the switch 84 whereupon the switch blades 87 and 88 thereof will be caused to engage with their contacts and the switch blade 89 will be caused to be disengaged from its contacts. Since the interlocking switch 60ᵃ, located in the circuit 113, is open, the engagement of the switch blade 87 with its contacts 87ᵃ will be ineffective to connect the conductor 83 to the control conductor 27. Opening of the interlocking switch 61ᶜ, which is located in the conductor 120, will have no effect upon the switch 90 since the operating winding 91 thereof is already unenergized. Closing of the interlocking switch 61ᵈ, which is located in the circuit 122, will effect a connection between the conductor 83 and control conductor 27 since the switch blade 98 and coöperating contacts 98ᵃ, which are located in circuit 122, are in engagement and the interlocking switch 62ᵇ, located in the circuit 122, is closed. The conductor 83 will, therefore, be energized and in the manner hereinbefore described, the operating windings 80 and 81 of the valves 76 and 77 will be energized and through the operation of the valves 76 and 77 and of the motor 65 the pole changing switch 24 is moved to the six pole position. The six pole windings of the induction machine 1 will, therefore, be connected to the source of current supply. Operation of the pole changing switch 24 to the six pole position will move the segment 109 out of engagement with the contacts 109ᵃ and 109ᵇ. The disengagement of the segment 109 from the contacts 109ᵃ and 109ᵇ has no effect upon the operating winding 85 of the switch 84 which is already unenergized.

The reason for changing from an eight pole to a six pole connection when the speed under these conditions reaches 18.6 is so that above this speed the maximum braking torque will be developed by the motor. From Fig. 7 it will be observed that the braking torque developed by the eight pole connection is less above this speed than that developed by the six pole connection.

If now the speed of the induction motor increases above 26.2 miles per hour, the switch actuating rod 62 will be moved to its right-hand position by differential mechanism 40 and the interlocking switches 62ᵃ, 62ᵇ and 62ᶜ will be opened and the interlocking switch 62ᵈ will be closed. Opening of the interlocking switch 62ᵃ, which is located in the circuit 116, will have no effect upon the operating winding 85 of the switch 84 since the contact 110ᵇ is unenergized. Opening of the interlocking switch 62ᵇ, which is located in the circuit 122 will effect the disconnection of the conductor 83 from the control conductor 27. Opening of the interlocking switch 62ᶜ, which is located in circuit 124, will have no effect upon the operating winding 96 of the switch 95, which is already unenergized. Closing of the interlocking switch 62ᵈ, which is located in the circuit 126, will effect the connection of the conductor 82 to the control conductor 27. The conductor 83 is now deënergized and the conductor 82 is energized so that the operating windings 80 and 81 of the switches 76 and 77 will be deënergized and the operating windings 78 and 79 of the switches 75 and 76 will be energized. For reasons hereinbefore described, the pole changer 24 will now be operated to four pole position so that four pole winding of the induction machine 1 will be connected to the source of supply in order that the largest braking torque possible will be developed as the speed of the motors continues to increase.

The locomotive, however, is not very apt to ever reach a speed of 26.2 miles per hour under such conditions as it would require the locomotive to be on a very steep down grade with a train of a greater tonnage than the locomotive could hold back. The engineer would also probably notice that the speed is higher than that which he intended to run at, as shown by the setting of the pole selector 63 for eight poles, and, therefore, he would apply the air brakes to reduce the speed.

From the above description it will be observed that with the pole selector 63 in the eight pole position, the eight pole winding of the induction motor 1 remains connected to the current supply until a speed of 18.6 miles per hour is reached at which time the six pole winding of the induction motor 1 is connected to the current supply because above this speed the braking torque produced by the six pole winding is greater than the eight pole winding. For the same reason the four pole winding is connected to the current supply when the speed reaches 26.2 miles per hour. It will be seen that the change from the eight pole to the six pole and from the six pole to the four pole connection takes place at speeds when the braking torque of the respective connections is approximately equal.

Let us now assume that while the speed of the motors is between 8.6 miles per hour and 18.6 miles per hour with the eight pole winding connected to the current supply, the engineer moves the pole selector 63 over to the six pole position. Referring to Fig. 7 it will be observed that a change from 8 to 6 pole connection at this time would cause a serious change in torque. The present arrangement, however, prevents this change in the pole connection at this time because the pole changing switch 24 is prevented from moving out of the eight pole position until a speed of 18.6 miles per hour is reached and the winding 85 of switch 84 is deënergized. The pole changing switch 24 is then moved to its six pole position in the manner above described. The movement of contact 108 into engagement with energized contact 108$^a$ at this time has no effect as the circuit 120 is opened at interlocking switch 61$^c$ and circuit 121 is opened at contact 94$^a$ of switch 91.

If the engineer had moved the pole selector 63 over to the four-pole position instead of the six-pole position, the operation of the pole changing switch would have taken place in the same manner at a speed of 18.6 miles per hour. The movement of contact 110 into engagement with the energized contact 110$^a$ closes the circuit 116 which includes the winding 85 of switch 84, and interlocking switches 62$^a$ and 61$^a$. The operation of switch 85 separates the switch blade 88 from contacts 88$^a$ and, therefore, prevents the circuit 114 being completed to energize conductor 82 after the pole changing switch 24 has been moved to its six pole position. Therefore, it will be evident that if the pole selector 63 is moved to either the six or four pole position after the speed of the motors has reached a speed of 8.6 miles, the operation of the system is the same as though the pole selection had been left in the eight pole position. Therefore, it will be impossible for the engineer to produce a large change in the torque by changing the pole connections at the wrong time.

Let it now be assumed that the engineer when starting moves the pole selector to the six pole position instead of the eight pole position. The operation of the system is the same as above described until a speed of 8.6 miles per hour is reached and the switch operating rod 59 is operated to its right-hand position and closes the interlocking switches 59$^a$ and 59$^b$. The closure of switch 59$^b$ does not complete a circuit for winding 85 of switch 84 to the control conductor 27 through circuit 117 because the segment 104 is not in engagement with contact 104$^a$. The closure of switch 59$^a$ connects the conductor 83 to the control conductor 27 through circuit 113. Conductor 83 will, therefore, be energized and cause the pole changing switch 24 to be moved to the six pole position. It will be observed, however, that the change takes place at a speed when there is no appreciable difference in the driving torque between the eight pole and the six pole connection. If the train is on a level track or on an upgrade the motors will continue to accelerate until a speed is reached where the driving torque of the motors is equal to the retarding force exerted by the train. If, however, the train is on a down grade the speed of the motors continues to increase, When a speed of 15.2 miles per hour is reached, the rod 60 is operated to its right-hand position by means of differential mechanism 40 and interlocking switches 60$^b$, 60$^c$ and 60$^d$ are closed and interlocking switch 60$^a$ is opened.

Upon the opening of switch 60$^a$, the circuit 113, by means of which the conductor 83 is connected to the control conductor 27, is opened, but the conductor 83 is still energized as follows: Upon the closure of switch 60$^c$, circuit 120 is closed and since segment 108 of pole changing switch 24 is in engagement with contacts 108$^a$ and 108$^b$ and segment 103 of the pole selector 63 is in engagement with contact 103$^a$, the winding 91 of relay 90 is connected to control conductor 27. Winding 91 becomes energized and moves the switch blades 93 and 94 into engagement with contacts 93$^a$ and 94$^a$ respectively. The engagement of switch blade 93 with contacts 93$^a$ closes circuit 119 so that the conductor 83 is still maintained energized. A holding circuit through the winding 91 is completed, when the switch blade 94 engages contacts 94$^a$, this circuit extending from control conductor 27, contacts 94$^a$ and switch blade 94 to circuit 120. The closure of switch 60$^d$ closes circuit 124, from the winding 96 of switch 95 to contact 107$^b$, but since the segment 107 is not in engagement with contacts 107$^a$ and 107$^b$ the winding 96 remains deënergized. The closure of switch 60$^b$ closes circuit 114 which connects conductor 83 to contact 112$^b$ of the pole changing switch 24, but since the pole selector 63 is in the six pole position, this circuit is not connected to control conductor 27. The six pole winding of motor 1, will, therefore, remain connected to the source of supply notwithstanding the fact that the speed thereof increases above 15.2 miles per hour.

When the speed of the induction motor is increased to about 18.6 miles per hour, the switch operating rod 61 is actuated as mentioned hereinbefore, thereby opening the interlocking switches 61$^b$ and 61$^c$, and closing interlocking switches 61$^a$ and 61$^d$. The opening of switch 61$^c$ opens the circuit 120 and causes the deënergization of winding 91 of switch 90. The opening of switch 61$^b$ opens the circuit 117, but this has no effect at this time as the winding 85 of switch 84 is already deënergized. The closure of switch 61$^a$ closes circuit 116 to connect the winding 85 of switch 84 to contact 110$^b$, but since the pole selector 63 is in the six pole position, this circuit is not connected to the control conductor 27, and, therefore, winding 85 remains deënergized. The closure of switch 61$^d$ closes circuit 122 to connect conductor 83 to control conductor 27, thereby substituting an energy circuit for the conductor 83 to replace the one which is opened when the winding 91 of the switch 90 is deenergized. The six pole winding of the motor will, therefore, remain connected to the source of the supply above a speed of 18.6 miles per hour.

If the speed of the induction motor is increased above 26.2 miles per hour, the switch operating rod 62 is actuated in the manner hereinbefore mentioned, thereby opening interlocking switches 62$^a$, 62$^b$ and 62$^c$ and closing interlocking switch 62$^d$. The opening of the interlocking switch 62$^a$, which is located in the circuit 116, will have no effect upon the operating winding 85 of the switch 84 since this winding is already unenergized. The opening of interlocking switch 62$^b$, which is located in the circuit 122 will effect the disconnection of the conductor 83 from the control conductor 27. The opening of interlocking switch 62$^c$, which is located in circuit 124, will have no effect upon the winding 96 of switch 95, as it is already unenergized. The closure of the interlocking switch 62$^d$, which is located in the circuit 126, will connect the conductor 82 to the control conductor 27. Therefore, for the reasons hereinbefore described, the pole changer 24 is now operated to move to its four pole position so that the four pole winding of the induction machine 1 is connected to the source of supply.

Let be assumed that the engineer now shuts off the controller 25 and applies the air brakes while the speed of the motor is above 26.2 miles an hour, and maintains them applied until the motor is brought to rest. The movement of the controller 25 to its "off" position disconnects the control conductor 27 from the battery 26 and therefore causes the deënergization of the windings 34, 57, 39 and 9. The deënergization of windings 34 and 57 has no effect at this time on the switches 20 and shaft 52 respectively, as they remain in their operated position, but the deënergization of the winding 39 opens the switch 38 which disconnects the pilot motor 37 from the supply circuit 4. The deënergization of winding 9 opens the switch 8 and disconnects the motor 1 from the supply circuit 4. Since the armature of the motor 1 is connected to the rotary element of the locomotive, it will continue to rotate until the locomotive stops, but the armature of the pilot motor 37 will stop very soon after the switch 38 is opened. The deënergization of the control conductor 27 also causes the deënergization of conductor 82 so that the pole changing switch 24 is returned to its eight-pole connection, so that when the controller 24 is again moved to an "on" position, the eight-pole winding of the motor 1 is connected to the supply circuit 4. It will be seen that the pilot motor 37 has to be connected to the supply 4 before the winding 9 of the relay 8 is energized to connect the transformer 5 to the supply circuit. This is to give the pilot motor 37 time to start operating and move the differential shafts 59, 60, 61 and 62 to their left-hand position if they are not already there.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. The combination with a variable pole dynamo electric machine operable as a motor or as a generator, of means operated responsively to the speed of said machine for changing the number of poles thereof at a predetermined speed during motoring operation and at a different speed during generating operation.

2. The combination with a variable pole dynamo electric machine adapted to be connected to a source of alternating current, of means responsive both to the speed of the machine and to the frequency of said source for changing the number of the poles of said machine.

3. The combination with a variable pole dynamo electric machine operable either as a motor or as a generator adapted to be connected to a source of alternating current, of means responsive both to the speed of said machine and to the frequency of the source for decreasing the poles of said machine from a higher to a lower number when the speed of said machine increases to a value at which the torque corresponding to the lower number of poles is approximately equal to the torque corresponding to the higher number of poles.

4. The combination with a variable pole dynamo electric machine operable either as a motor or as a generator adapted to be connected to a source of alternating current, of means responsive both to the speed of said machine and to the frequency of the source for increasing the poles of said machine from a lower to a higher number when the speed of said machine decreases to a value at which the torque corresponding to the higher number of poles is approximately equal to the torque corresponding to the lower number of poles.

5. The combination with a variable pole dynamo electric machine operable as a motor or as a generator and switch mechanism for controlling the same, of means operated responsively to the speed of the machine for automatically operating the switch mechanism to change from one pole number to another during motoring and generating operations when the character and value of the torque are substantially the same for both pole numbers.

6. The combination with a variable pole dynamo electric machine operable as a motor or as a generator, of means responsive to the speed of said machine for changing the number of poles thereof during motoring and generating operations without substantial change in the torque of the machine, and means for predetermining the minimum number of poles with which said machine will operate as a motor.

7. The combination with a variable pole dynamo electric machine operable as a motor or as a generator and switch mechanism for connecting the machine to a source of supply, of means responsive to the speed of said machine for changing the number of poles, a controller for predetermining the minimum number of poles at which the machine will operate as a motor, and connections whereby in case the speed of the machine is increased beyond the synchronous speed for motor operation at the number of poles predetermined by the controller and the machine becomes a generator, the number of poles is reduced at a speed of the machine such that the torque corresponding to the higher number of poles is approximately equal to the torque corresponding to the lower number of poles.

8. The combination with a variable pole dynamo electric machine operable as a motor or as a generator, of means responsive to the speed of said machine for automatically changing the number of poles thereof, a controller for predetermining the maximum number of poles with which said machine will operate as a generator, and connections whereby in case the speed of the machine is reduced below the synchronous speed for the number of poles predetermined by the controller and the machine operates as a motor, the number of poles is increased at a speed of the machine such that the torque corresponding to the lower number of poles is approximately equal to the torque corresponding to the higher number of poles.

9. The combination with a variable pole dynamo electric machine adapted to operate as a motor or as a generator, of means operated responsively to the speed of the machine for automatically changing the number of poles of said machine during motoring and generating operations without substantial change in the torque of the machine, and a controller for predetermining the number of poles at which the machine changes from motoring to generating.

10. The combination with a variable pole dynamo electric machine adapted to operate as a motor or as a generator, of means operated responsively to the speed of the machine for automatically changing the number of poles of said machine during motoring and generating operations without substantial change in the torque of the machine, and a controller for predetermining the number of poles at which the machine changes from generating to motoring operation.

11. The combination with a variable pole dynamo electric machine operable as a motor and as a generator, of a source of alternating current therefor, means responsive both to the speed of said machine and to the frequency of said source for changing the number of poles of said machine, and means for predetermining the number of poles at which said machine changes from motoring to generating and the number of poles at which said machine changes from generating to motoring.

12. The combination with a variable pole dynamo electric machine, of a controller for predetermining the maximum speed at which said machine will operate as a motor, and means for automatically changing the number of poles of said machine operating as a generator at a speed such that the character and value of the torque of both pole numbers are substantially the same.

13. The combination with a variable pole dynamo electric machine operable as a motor and as a generator, of means for arbitrarily selecting a pole number which shall be the minimum with which said machine will operate as a motor and the maximum with which said machine will operate as a generator, and automatic means for changing from one pole number to the next during motoring and generating operations without substantial change in torque.

14. The combination with a variable pole dynamo electric machine operable as a motor and as a generator, of means responsive to the speed of said machine for changing from one pole number to another pole number without substantial change in torque during motoring and generating operations, and pole selecting means operable to predetermine the minimum number of poles, subsequently obtainable through the operation of said first mentioned means, at which said machine will operate as a motor.

15. The combination with a variable pole dynamo electric machine operable as a motor and as a generator, of means responsive to the speed of said machine for changing from one pole number to another pole number without substantial change in torque during motoring and generating operations, and pole selecting means operable to predetermine the maximum number of poles, subsequently obtainable through the operation of said first mentioned means, at which said machine will operate as a generator.

16. The combination with a variable pole dynamo electric machine, of switch mechanism for changing the machine from one number of poles to another, differential gearing for controlling the switch mechanism, one end of the differential being operated responsively to the speed of the motor and the other end being operated responsively to the frequency of the source of supply, and connections whereby the switch mechanism is automatically operated to change the number of poles of said machine from one number to another when the character and value of the torque are substantially the same for both pole numbers.

17. The combination with a variable pole dynamo electric machine, of means responsive to the speed of said machine for automatically changing the number of poles of said machine, and means for automatically insuring that upon starting the motor, it will be connected to the source of supply with the greatest number of poles irrespective of the number of poles with which the machine had previously been operated.

18. In combination, a variable pole dynamo electric machine operable as a motor, a pilot motor, and means controlled by the speeds of said machine and motor for changing the number of poles of said machine.

19. In combination, a variable pole dynamo electric machine operable as a motor, a pilot motor, differential mechanism connected to said machine and motor, and means controlled by said mechanism for changing the number of poles of said machine.

20. In combination, a variable pole dynamo electric machine operable as a motor, a pilot motor, differential mechanism connected to said machine and motor, and means comprising a motor controlled by said mechanism for changing the number of poles of said machine.

21. In combination, a variable pole dynamo electric machine, a pilot motor, differential mechanism operated by said machine and motor, pole selecting means, and means controlled by said differential mechanism and said pole selecting means for changing the number of poles of said machine.

22. In combination, a variable pole dynamo electric machine, a pilot motor, differential mechanism operated by said machine and motor, pole selecting means, and motor operated means controlled by said differential mechanism and said pole selecting means for changing the number of poles of said machine.

23. In combination, a variable pole dynamo electric machine adapted to be connected to a source of supply, a pilot motor, differential mechanism comprising an element connected to said machine and an element connected to said motor, means for reversing the connections between said source and said machine, means controlled by the last named means for reversing the connection between the first named element and said machine upon a reversal in the connections between said source and said machine, and means controlled by said mechanism for changing the number of poles of said machine.

24. In combination, a variable pole dynamo electric machine adapted to be connected to a source of supply, a pilot motor, differential mechanism comprising an element connected to said machine and an element connected to said motor, means for reversing the connections between said source and said machine, means controlled by the last named means for reversing the connection between the first named element and said machine upon a reversal in the connections between said source and said machine, pole selecting means, and motor operated means controlled by said differential mechanism and said pole selecting means for changing the number of poles of said machine.

25. In combination, a variable pole dynamo electric machine, a pilot motor, a source of alternating current for said dynamo electric machine and pilot motor, means for varying the voltage impressed upon said machine, means for reversing the electrical connections between said source and said machine, differential mechanism comprising an element connected through reversing mechanism to said machine, an element connected to said motor, and a yoke actuated by said elements, means operable upon the reversal of the electrical connections between said source and machine to operate the reversing mechanism between said machine and the element of the differential mechanism connected thereto, pole selecting means, and means jointly controlled by the yoke of said differential mechanism and said pole selecting means for changing the number of poles of said machine.

In witness whereof, I have hereunto set my hand this 26th day of February, 1919.

WILLIAM S. H. HAMILTON.